US012636729B2

(12) United States Patent
Kubota et al.

(10) Patent No.: US 12,636,729 B2
(45) Date of Patent: May 26, 2026

(54) WELDING CONDITION EVALUATION METHOD

(71) Applicant: Panasonic Intellectual Property Management Co., Ltd., Osaka (JP)

(72) Inventors: Kenta Kubota, Osaka (JP); Michio Sakurai, Osaka (JP); Toshiyuki Mishima, Osaka (JP); Toru Sakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 136 days.

(21) Appl. No.: 18/815,055

(22) Filed: Aug. 26, 2024

(65) Prior Publication Data

US 2024/0424613 A1 Dec. 26, 2024

Related U.S. Application Data

(63) Continuation of application No. PCT/JP2023/003553, filed on Feb. 3, 2023.

(30) Foreign Application Priority Data

Mar. 1, 2022 (JP) ................................. 2022-030998

(51) Int. Cl.
*B23K 26/03* (2006.01)
*B23K 31/12* (2006.01)
*G01B 11/22* (2006.01)

(52) U.S. Cl.
CPC .......... *B23K 26/032* (2013.01); *B23K 31/125* (2013.01); *G01B 11/22* (2013.01)

(58) Field of Classification Search
CPC ..... G01B 11/22; G01B 11/24; G01B 11/2441; G01B 11/25; G01B 11/30; G01B 11/303;
(Continued)

(56) References Cited

U.S. PATENT DOCUMENTS

| | | | | | |
|---|---|---|---|---|---|
| 5,517,420 | A | * | 5/1996 | Kinsman ................ | B23K 26/03 |
| | | | | | 706/900 |
| 6,326,589 | B1 | * | 12/2001 | Beersiek ............ | B23K 26/1423 |
| | | | | | 219/121.63 |

(Continued)

FOREIGN PATENT DOCUMENTS

| | | | | | |
|---|---|---|---|---|---|
| CN | 113237432 | A | * | 8/2021 | ............ G01B 11/22 |
| JP | 10-263863 | | | 10/1998 | |

(Continued)

OTHER PUBLICATIONS

International Search Report issued in International Application No. PCT/JP2023/003553 on Apr. 25, 2023.

*Primary Examiner* — Gordon J Stock, Jr.
(74) *Attorney, Agent, or Firm* — Wenderoth, Lind & Ponack, L.L.P.

(57) ABSTRACT

Point group data obtained by measuring the penetration depth of a keyhole 66 during laser welding is divided into a plurality of regions in the depth direction of measured values, and evaluation data showing a change in number of points with time is acquired for each of the plurality of regions. An average variation in number of points is calculated for each of the plurality of regions based on the plurality of pieces of evaluation data. When the average variation is equal to or larger than a predetermined threshold, it is determined that measurement of the penetration depth of the keyhole 66 is unstable under the welding condition.

2 Claims, 12 Drawing Sheets

(58) Field of Classification Search
CPC  G01B 11/306; G01B 9/02091; G01B 5/0037;
B23K 31/00; B23K 31/003; B23K
31/125; B23K 26/00; B23K 26/21; B23K
26/22
See application file for complete search history.

(56) References Cited

U.S. PATENT DOCUMENTS

| | | | | |
|---|---|---|---|---|
| 8,735,768 | B2 * | 5/2014 | Urashima | B23K 26/26 |
| | | | | 219/121.75 |
| 11,027,364 | B2 * | 6/2021 | Schönleber | B23K 26/048 |
| 11,396,061 | B2 * | 7/2022 | Yokoyama | B23K 26/705 |
| 11,426,816 | B2 * | 8/2022 | Webster | B23K 26/032 |
| 11,999,017 | B2 * | 6/2024 | Lessmueller | B23K 26/0643 |
| 12,397,368 | B2 * | 8/2025 | Webster | B23K 31/125 |
| 2003/0038120 | A1 | 2/2003 | Minamida et al. | |
| 2012/0285936 | A1 | 11/2012 | Urashima et al. | |
| 2016/0202045 | A1 * | 7/2016 | Schönleber | B23K 26/046 |
| | | | | 356/497 |
| 2017/0095885 | A1 | 4/2017 | Zhang et al. | |
| 2019/0041196 | A1 | 2/2019 | Strebel | |
| 2020/0376591 | A1 * | 12/2020 | Sakai | B23K 26/064 |
| 2022/0324054 | A1 * | 10/2022 | Walde | B23K 26/0876 |
| 2024/0375208 | A1 * | 11/2024 | Haug | B23K 26/032 |

FOREIGN PATENT DOCUMENTS

| | | | | |
|---|---|---|---|---|
| JP | 5252026 | | 7/2013 | |
| JP | 2015-120188 | | 7/2015 | |
| JP | 2015-188938 | | 11/2015 | |
| JP | 2019-534788 | | 12/2019 | |
| JP | 2020099922 | A * | 7/2020 | |
| JP | 2020099924 | A * | 7/2020 | |
| WO | WO-2021228761 | A1 * | 11/2021 | B23K 26/32 |
| WO | WO-2022207855 | A1 * | 10/2022 | H01M 50/516 |
| WO | WO-2024158772 | A1 * | 8/2024 | G01B 9/02091 |

* cited by examiner

FIG.2

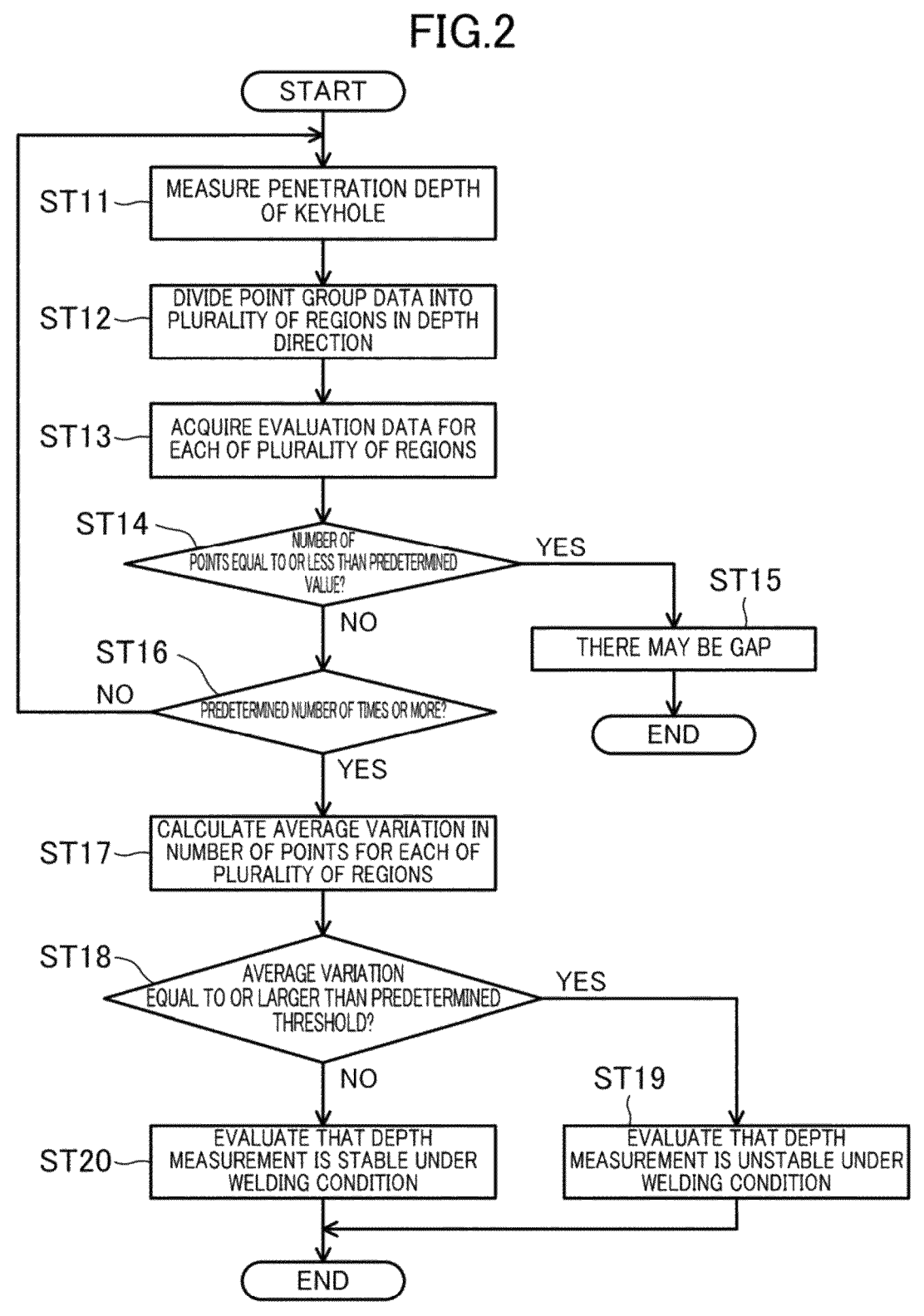

```
                    ┌─────────────┐
                    │    START    │
                    └──────┬──────┘
                           │
   ┌───────────────────────┼
   │                       ▼
   │  ST11 ──┌──────────────────────────────┐
   │         │ MEASURE PENETRATION DEPTH     │
   │         │        OF KEYHOLE             │
   │         └──────────────┬───────────────┘
   │                        ▼
   │  ST12 ──┌──────────────────────────────┐
   │         │ DIVIDE POINT GROUP DATA INTO  │
   │         │ PLURALITY OF REGIONS IN DEPTH │
   │         │          DIRECTION            │
   │         └──────────────┬───────────────┘
   │                        ▼
   │  ST13 ──┌──────────────────────────────┐
   │         │ ACQUIRE EVALUATION DATA FOR   │
   │         │ EACH OF PLURALITY OF REGIONS  │
   │         └──────────────┬───────────────┘
   │                        ▼
```

ST14 — NUMBER OF POINTS EQUAL TO OR LESS THAN PREDETERMINED VALUE?  — YES → ST15

ST15 — THERE MAY BE GAP → END

NO

ST16 — PREDETERMINED NUMBER OF TIMES OR MORE?  NO (loop back)   YES

ST17 — CALCULATE AVERAGE VARIATION IN NUMBER OF POINTS FOR EACH OF PLURALITY OF REGIONS

ST18 — AVERAGE VARIATION EQUAL TO OR LARGER THAN PREDETERMINED THRESHOLD?  — YES → ST19

NO

ST20 — EVALUATE THAT DEPTH MEASUREMENT IS STABLE UNDER WELDING CONDITION

ST19 — EVALUATE THAT DEPTH MEASUREMENT IS UNSTABLE UNDER WELDING CONDITION

END

POINT GROUP DATA (POWER: 3.1kW)

POINT GROUP DATA (POWER: 2.3kW)

NUMBER OF POINTS IN FIRST REGION (n4) (POWER: 3.1kW)

NUMBER OF POINTS IN FIRST REGION (n4) (POWER: 2.3kW)

FIG.12
NUMBER OF POINTS IN SECOND REGION (n4) (POWER: 3.1kW)
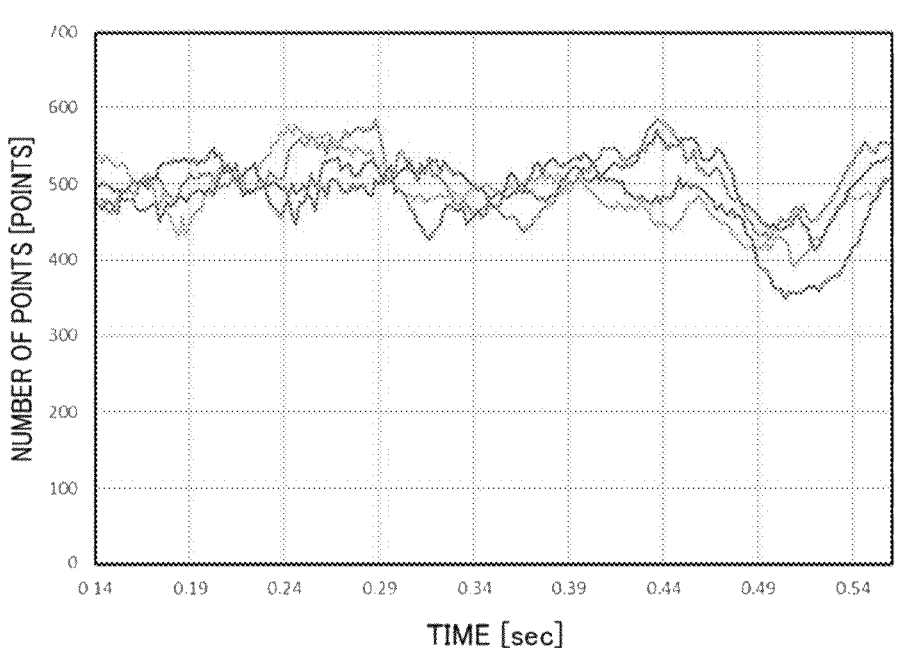
FIG.13
NUMBER OF POINTS IN SECOND REGION (n4) (POWER: 2.3kW)
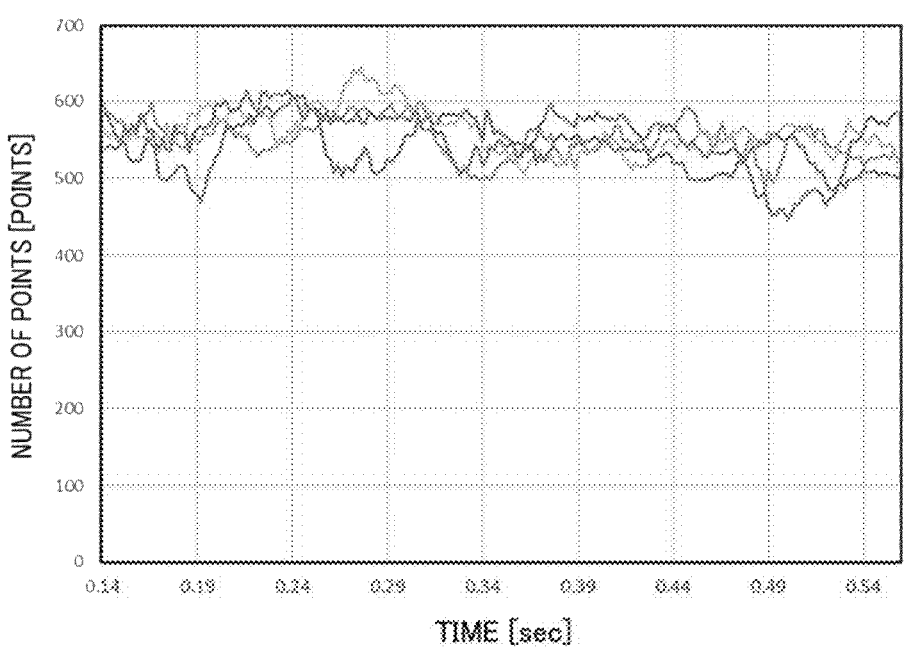

NUMBER OF POINTS IN THIRD REGION (n4) (POWER: 3.1kW)

NUMBER OF POINTS IN THIRD REGION (n4) (POWER: 2.3kW)

VARIATION AMONG NUMBERS OF POINTS IN FIRST REGION FOR EACH LASER POWER

VARIATION AMONG NUMBERS OF POINTS IN SECOND REGION FOR EACH LASER POWER

VARIATION AMONG NUMBERS OF POINTS IN THIRD REGION FOR EACH LASER POWER 2.3kW 3.1kW

TIME [sec]

| WELDING CONDITION | REGION | AVERAGE VARIATION | MAXIMUM VARIATION | MINIMUM VARIATION |
|---|---|---|---|---|
| 2.3kW | 1 | 188 | 440 | 19 |
| | 2 | 82 | 168 | 27 |
| | 3 | 173 | 309 | 41 |
| 3.1kW | 1 | 66 | 119 | 18 |
| | 2 | 71 | 123 | 4 |
| | 3 | 93 | 180 | 19 |

WELDING CONDITION EVALUATION METHOD

CROSS-REFERENCE TO RELATED APPLICATIONS

This is a continuation of International Application No. PCT/JP2023/003553 filed on Feb. 3, 2023, which claims priority to Japanese Patent Application No. 2022-030998 filed on Mar. 1, 2022. The entire disclosures of these applications are incorporated by reference herein.

BACKGROUND

The present invention relates to methods for evaluating a welding condition.

Japanese Patent No. 5252026 discloses a laser welding device that coaxially superimposes an object beam from an optical interferometer on a laser beam to direct the resultant beam to a weld portion, and determines the quality of the weld portion based on the penetration depth of a keyhole identified according to the optical path difference between the object beam and the reference beam.

SUMMARY

The penetration depth of a keyhole may not be able to be stably measured depending on the welding condition of the laser welding device.

Specifically, when the temperature of molten metal of a weld portion becomes higher than its boiling point and plume is generated in the weld portion, the surface and inner wall surface of a keyhole are pressed. This causes the keyhole to pulsate and change its shape, which results in a variation in measured value of the penetration depth of the keyhole.

In the case where welding is performed under such a welding condition that a penetration bead, namely a phenomenon that a welding bead protrudes from the back side of the weld surface of an object to be welded, is randomly formed, the penetration depth of the keyhole tends to be large when a penetration bead is formed, whereas the penetration depth of the keyhole tends to be small when no penetration bead is formed.

Therefore, there is a demand to evaluate whether the welding condition is suitable for measuring the penetration depth of a keyhole.

The present invention was made in view of the above circumstances, and an object of the present invention is to determine whether the welding condition is suitable for stably measuring the penetration depth of a keyhole.

According to a first aspect, a method for evaluating a welding condition for performing laser welding by emitting a laser beam to a workpiece includes: a first step of emitting a measurement beam to a keyhole of the workpiece during the laser welding to measure a penetration depth of the keyhole; a second step of dividing point group data showing a plurality of measured values obtained in the first step and times at which the measured values are obtained into a plurality of regions in a depth direction of the measured values; a third step of counting, for each of the plurality of regions, the number of points that indicates the number of the measured values during a predetermined time, and acquiring, for each of the plurality of regions, evaluation data showing a change in the number of points with time; a fourth step of performing the first to third steps a plurality of times to acquire a plurality of pieces of the evaluation data; a fifth step of calculating, for each of the plurality of regions, an average variation in the number of points based on the plurality of pieces of evaluation data; and a sixth step of, when the average variation is equal to or larger than a predetermined threshold, determining that measurement of the penetration depth of the keyhole is unstable under the welding condition.

In the first aspect, the average variation in the number of points in each region is evaluated based on the point group data of the measured values obtained during the laser welding. It is therefore possible to determine whether the welding condition is suitable for stably measuring the penetration depth of the keyhole.

According to a second aspect, in the method for evaluating a welding condition according to the first aspect, the workpiece includes a first member and a second member placed under the first member. In the first step, the measurement beam is emitted to the keyhole formed at a position where the first member and the second member are placed on top of one another. The method further includes a seventh step of, when the number of points acquired in the third step is equal to or less than a predetermined value, determining that there is a gap between the first member and the second member.

In the second aspect, when the number of points is counted for each of the plurality of regions in the point group data and there is a region where the number of points is small, it can be determined that there is a gap in that region.

According to the aspects of the present disclosure, it is possible to determine whether the welding condition is suitable for stably measuring the penetration depth of the keyhole.

BRIEF DESCRIPTION OF THE DRAWINGS

FIG. 2 is a flowchart showing the steps of a method for evaluating a welding condition.

FIG. 12 is a graph showing changes in number of points in the second region with time when the laser power is 3.1 kW.

FIG. 13 is a graph showing changes in number of points in the second region with time when the laser power is 2.3 kW.

DETAILED DESCRIPTION

Hereinafter, an embodiment of the present invention will be described with reference to the drawings. The following description of the preferred embodiment is merely illustrative in nature, and is not intended to limit the present invention, its applications, or its uses.

<Configuration of Laser Welding Device>

Figure 1:
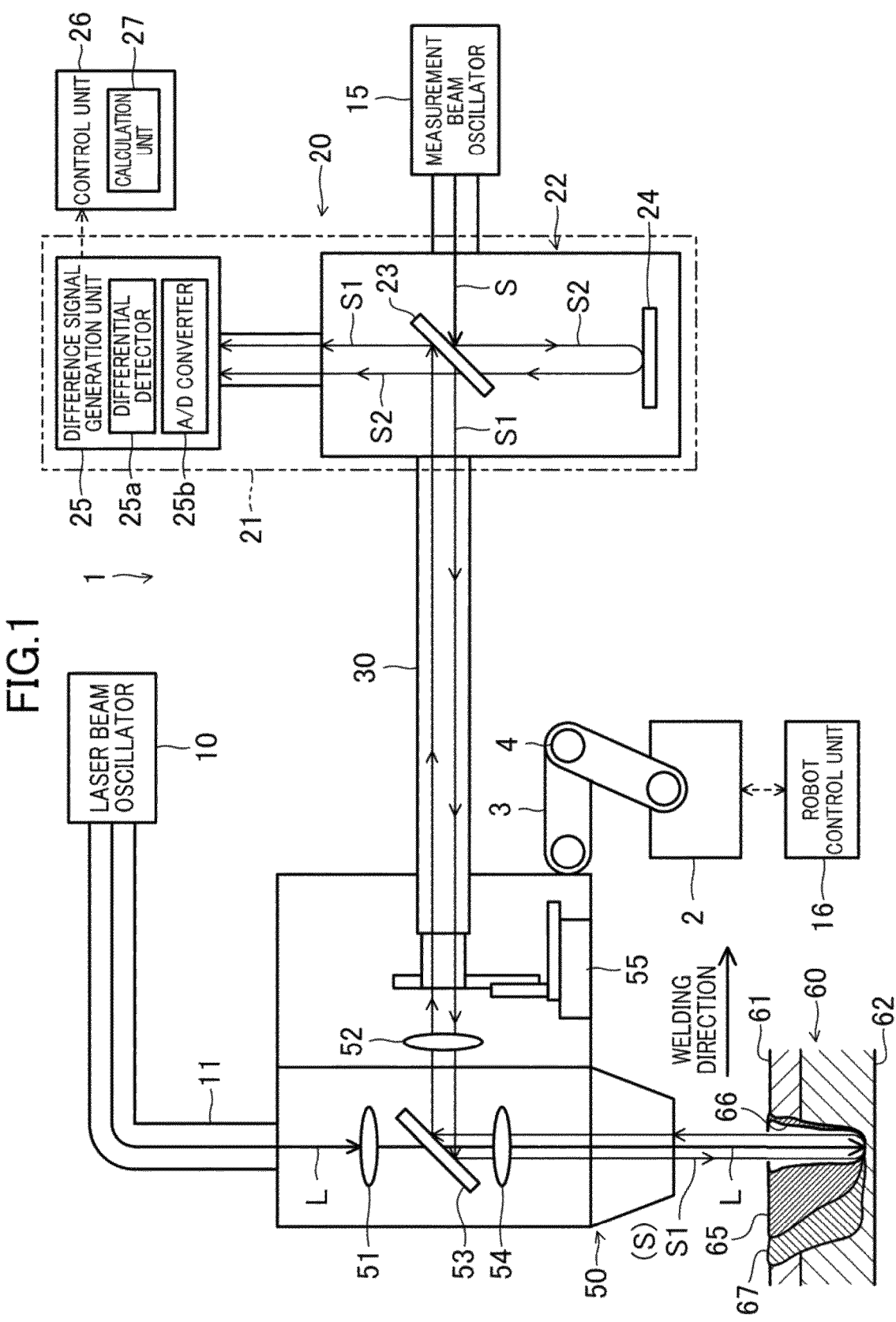
FIG. 1 shows the configuration of a laser welding device according to an embodiment.

FIG. 1 shows the configuration of a laser welding device according to the present embodiment. As shown in FIG. 1, a laser welding device 1 includes a laser beam oscillator 10, a measurement beam oscillator 15, an optical interferometer device 20, an image fiber 30, a laser head 50, a robot 2, and a robot control unit 16.

The laser beam oscillator 10 generates a laser beam L. The laser beam oscillator 10 is connected to the laser head 50 by a transmission fiber 11. The laser beam L is transmitted from the laser beam oscillator 10 to the laser head 50 via the transmission fiber 11.

The measurement beam oscillator 15 generates a measurement beam S having a different wavelength from the laser beam L. The measurement beam S generated by the measurement beam oscillator 15 enters the optical interferometer device 20. The wavelength difference between the laser beam L and the measurement beam S is preferably 100 nm or more.

The measurement beam oscillator 15 continuously emits the measurement beam S having a different wavelength from the laser beam L and a narrow wavelength range, and periodically changes the central wavelength of the measurement beam S that it emits. The operation of periodically changing the central wavelength of the measurement beam S is called wavelength scanning.

The optical interferometer device 20 measures the penetration depth of a weld portion 65 of a workpiece 60 using swept source optical coherence tomography (SS-OCT).

The optical interferometer device 20 includes a detection unit 21 and a control unit 26. The detection unit 21 includes an optical interference optical unit 22 and a difference signal generation unit 25.

The optical interference optical unit 22 includes a beam splitter 23 and a reference mirror 24. The beam splitter 23 splits the measurement beam S emitted from the measurement beam oscillator 15 into a first measurement beam S1 and a second measurement beam S2.

The first measurement beam S1 refers to a measurement beam that is emitted to the welded portion 65 to be measured, and the second measurement beam S2 refers to a measurement beam that is emitted to the reference mirror 24, namely a reference surface.

The reference mirror 24 reflects the second measurement beam S2. The second measurement beam S2 reflected by the reference mirror 24 is guided to the difference signal generation unit 25. As will be described in detail later, the first measurement beam S1 is emitted to the weld portion 65 of the workpiece 60 through the image fiber 30 and the laser head 50. At this time, the first measurement beam S1 is coaxially superimposed on the laser beam L by an optical system in the laser head 50.

Part of the first measurement beam S1 emitted to the weld portion 65 of the workpiece 60 is reflected by the weld portion 65 back into the optical interferometer device 20 through the image fiber 30. The first measurement beam S1 having entered the optical interferometer device 20 is reflected by the beam splitter 23 into the difference signal generation unit 25.

The length of the optical path that the first measurement beam S1 travels until it enters the difference signal generation unit 25 after passing through the beam splitter 23 is defined as the optical path length of the first measurement beam S1.

The second measurement beam S2 is reflected by the beam splitter 23 and guided to the reference mirror 24. The second measurement beam S2 guided to the reference mirror 24 is reflected by the reference mirror 24 and then enters the difference signal generation unit 25.

The length of the optical path that the second measurement beam S2 travels until it enters the difference signal generation unit 25 after it is reflected by the beam splitter 23 is defined as the optical path length of the second measurement beam S2. The optical path length of the second measurement beam S2 is measured in advance as a reference value.

The optical path length of the first measurement beam S1 and the optical path length of the second measurement beam S2 are typically adjusted to the same length in advance. For example, when there is no penetration in the workpiece 60, the position of the reference mirror 24 is adjusted so that the two optical path lengths become the same.

At this time, the first measurement beam S1 and the second measurement beam S2 are combined into one light beam that is an interference beam. A detection signal indicating the interference beam is entered into the difference signal generation unit 25.

The difference signal generation unit 25 receives the first measurement beam S1 reflected by the workpiece 60 and the second measurement beam S2 reflected by the reference mirror 24, and generates a difference signal indicating the phase difference between the optical path length of the first measurement beam S1 and the optical path length of the second measurement beam S2.

Specifically, the difference signal generation unit 25 includes a differential detector 25a and an A/D converter 25b. The differential detector 25a removes the influence of noise contained in the interference beam composed of the first measurement beam S1 and the second measurement beam S2. The differential detector 25a converts the interference beam from which the noise has been removed to an electrical signal according to the intensity of the interference beam, and generates a difference signal indicating the phase difference between the optical path length of the first measurement beam S1 and the optical path length of the second measurement beam S2. The differential detector 25a outputs the generated difference signal to the A/D converter 25b.

The A/D converter 25b receives from the measurement beam oscillator 15 a trigger output synchronized with the repetition frequency of wavelength scanning. Based on the received trigger output, the A/D converter 25b collects the difference signal output from the differential detector 25a, in synchronization with the repetition period of the measurement beam oscillator 15.

Interference according to the difference in optical path length between the first measurement beam S1 and the second measurement beam S2 occurs in the interference beam. The difference signal indicating the phase difference between the optical path length of the first measurement beam S1 and the optical path length of the second measurement beam S2 is output to a calculation unit 27 of the control unit 26. The calculation unit 27 calculates the penetration depth of the weld portion 65 of the workpiece 60 based on the received difference signal.

Specifically, the calculation unit 27 performs a fast Fourier transform (FFT) on the received difference signal to calculate the penetration depth of the weld portion 65 based on the result of the FFT.

The workpiece 60 includes a first member 61 and a second member 62. The second member 62 is placed under the first member 61. The first member 61 and the second member 62 are placed on top of one another. For example, the first member 61 and the second member 62 are each made of a plate material with a thickness of 1 mm.

The laser welding device 1 welds the first member 61 and the second member 62 together by emitting the laser beam L from above the first member 61 to the position where the first member 61 and the second member 62 are placed on top of one another.

The laser head 50 includes a first collimating lens 51, a second collimating lens 52, a dichroic mirror 53, a focusing lens 54, and an XYZ stage 55.

The first collimating lens 51 collimates the laser beam L emitted from an emitting end of the transmission fiber 11. The second collimating lens 52 collimates the first measurement beam S1 emitted from an emitting end of the image fiber 30.

The XYZ stage 55 is disposed on the incident side of the second collimating lens 52. The emitting end of the image fiber 30 is connected to the XYZ stage 55. The XYZ stage 55 adjusts the incident position of the first measurement beam S1 on the dichroic mirror 53.

The dichroic mirror 53 transmits the laser beam L and reflects the first measurement beam S1. The dichroic mirror 53 coaxially superimposes the laser beam L and the first measurement beam S1 on each other and guides the resultant beam to the focusing lens 54.

The focusing lens 54 converges the laser beam L and the first measurement beam S1. The laser beam L and the first measurement beam S1 converged by the focusing lens 54 are directed to the workpiece 60.

The focusing lens 54 also has a function to cause the first measurement beam S1 reflected from the weld portion 65 of the workpiece 60 to enter the optical interferometer device 20 again through the dichroic mirror 53.

The robot 2 has a robot arm 3. The laser head 50 is attached to the distal end of the robot arm 3. The robot arm 3 has a plurality of joints 4.

The robot 2 moves the laser head 50 in a predetermined welding direction based on a command from the robot control unit 16, and thus changes the position of the laser head 50 relative to the workpiece 60. Laser welding is performed by moving the positions of the laser beam L and the first measurement beam S1 relative to the workpiece 60 in this manner.

The robot control unit 16 is connected to the laser beam oscillator 10, the laser head 50, and the robot 2. The robot control unit 16 controls the operations of the laser beam oscillator 10, the laser head 50, and the robot 2. The robot control unit 16 has functions to control when to start and stop outputting the laser beam L and to control the power intensity of the laser beam L etc., in addition to a function to control the moving speed of the laser head 50.

When welding the weld portion 65 of the workpiece 60 including the first member 61 and the second member 62 by the laser welding device 1, the laser beam L is emitted from above the workpiece 60 toward the top surface of the first member 61.

The weld portion 65 irradiated with the laser beam L melts from the top to form a molten pool. When the weld portion 65 melts, molten metal vaporizes from the molten pool, and a keyhole 66 is formed by the pressure of the vapor generated during the vaporization. The molten pool and the keyhole 66 are herein together regarded as the weld portion 65. A welding bead 67 is formed behind the molten pool in the welding direction as the molten pool solidifies.

At this time, the dichroic mirror 53 coaxially superimposes the first measurement beam S1 emitted from the measurement beam oscillator 15 on the laser beam L emitted from the laser beam oscillator 10. The laser beam L and the first measurement beam S1 are emitted into the keyhole 66. The emitted first measurement beam S1 is reflected at the bottom of the keyhole 66 and enters the optical interferometer device 20 through the dichroic mirror 53.

The difference signal generation unit 25 of the optical interferometer device 20 generates a difference signal indicating the phase difference between the optical path length of the first measurement beam S1 and the optical path length of the second measurement beam S2. The calculation unit 27 of the control unit 26 calculates the depth of the keyhole 66 as the penetration depth of the weld portion 65, based on the difference signal. The laser welding device 1 determines the quality of the weld portion 65 based on the identified penetration depth.

<Method for Evaluating Welding Condition>

The penetration depth of the keyhole 66 may not be able to be stably measured depending on the welding condition of the laser welding device 1.

Specifically, the keyhole 66 is formed by the pressure of the vapor generated when the molten metal in the weld portion 65 vaporizes. When the temperature of the molten metal in the weld portion 65 becomes higher than its boiling point and plume is generated in the weld portion 65, the surface and inner wall surface of the keyhole 66 are pressed by the pressure of the vapor (metal vapor) generated during vaporization of the metal. This causes the keyhole 66 to pulsate and change its shape. The shape of the keyhole 66 that is formed varies depending on the power and emission time of the laser beam L, the state of the molten pool, etc. Therefore, even if an attempt is made to emit the measurement beam S to the deepest part of the keyhole 66, the measurement beam S may be reflected at the shallow part of the keyhole 66, which results in a variation in measured value.

The present embodiment makes it possible to evaluate whether the welding condition is suitable for stably measuring the penetration depth of the keyhole 66. Various calculations described below are performed by the calculation unit 27 of the control unit 26.

Figure 3:
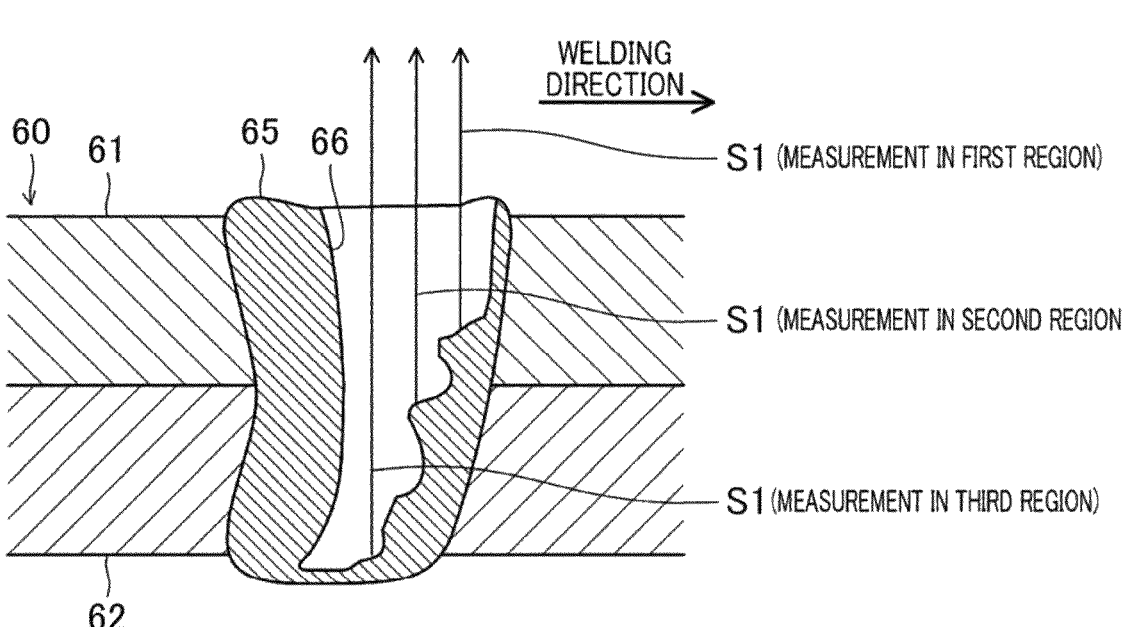
FIG. 3 is a side sectional view showing the penetration depth of a keyhole being measured during laser welding.

As shown in FIG. 2 (flowchart showing the steps of a method for evaluating a welding condition), in step ST11, the first measurement beam S1 is emitted to the keyhole 66 of the workpiece 60 during laser welding to measure the penetration depth of the keyhole 66. As shown in FIG. 3 (side sectional view showing the penetration depth of the keyhole being measured during laser welding), the measured value of the penetration depth of the keyhole 66 varies depending on the shape of the inner wall portion of the keyhole 66. Therefore, point group data as shown in the graph of FIG. 4 (graph showing point group data divided into three regions in the depth direction of the measured values) can be obtained by associating a plurality of measured values obtained in step ST11 with the times at which the measured values were obtained.

Figure 4:
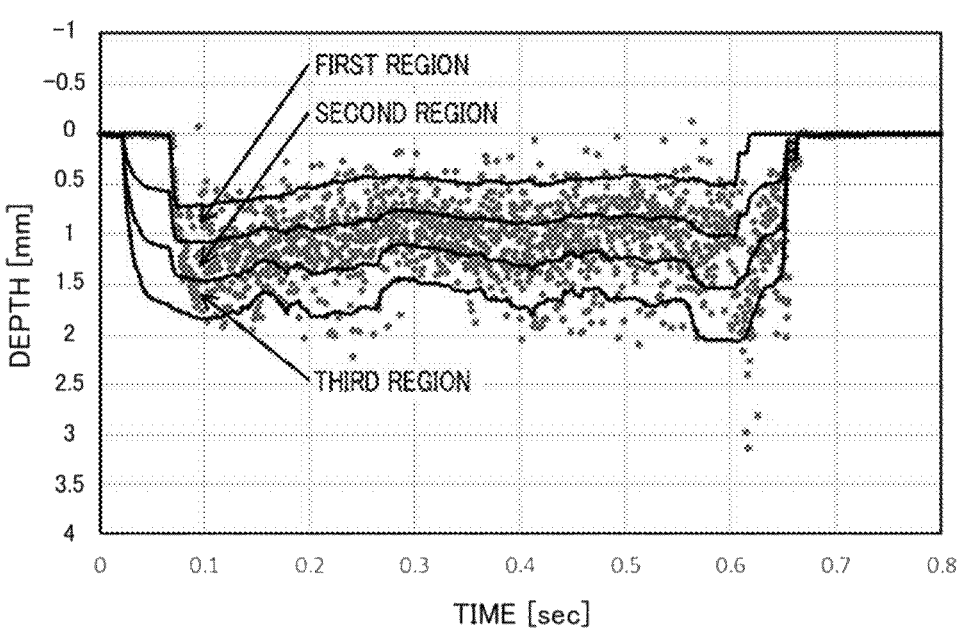
FIG. 4 is a graph showing point group data divided into three regions in the depth direction of measured values.

In the ordinate in FIG. 4, the top surface of the first member 61 of the workpiece 60 corresponds to the depth of 0 mm, and the penetration depth of the keyhole 66 becomes greater as it gets closer to the lower end of the ordinate.

In step ST12 shown in FIG. 2, point group data showing a plurality of measured values and the times at which the measured values were obtained is divided into a plurality of regions in the depth direction of the measured values. In the example shown in FIG. 4, the point group data is divided into three regions in the depth direction. Of the three regions, the region closest to the top surface of the first member 61 of the workpiece 60 is herein referred to as the "first region," followed by the "second region" and the "third region," with the "third region" farthest from the top surface of the first member 61 of the workpiece 60.

In step ST13 shown in FIG. 2, the number of points that indicates the number of measured values during a predetermined time is counted for each of the regions to obtain, for each of the regions, evaluation data showing changes in number of points with time.

In order to more accurately evaluate a variation in penetration depth, the inventors considered dividing the point group data into three regions and evaluating a variation in penetration depth for each region.

Figure 5:
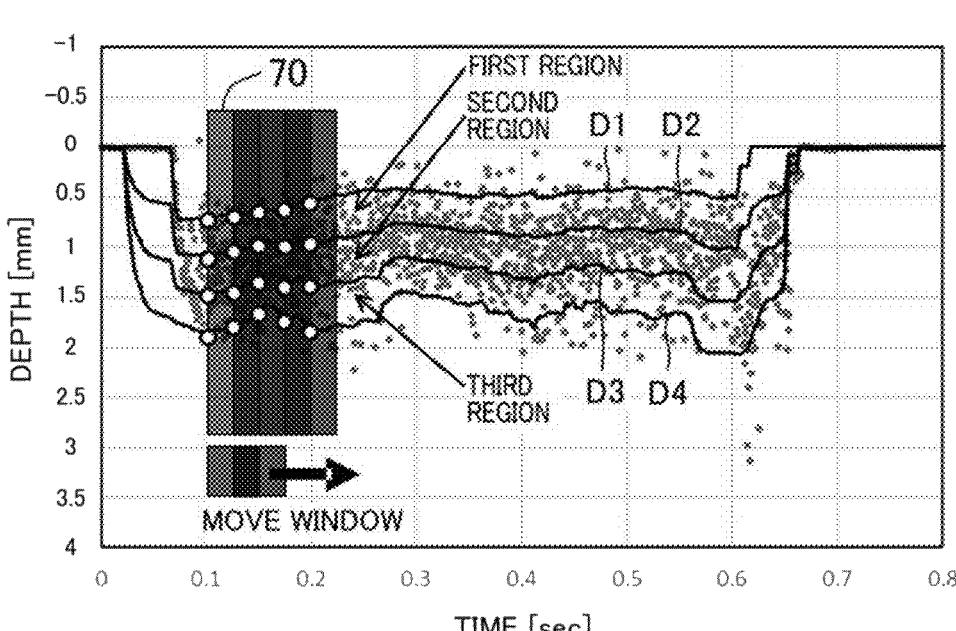
FIG. 5 illustrates dividing lines that divide point group data into three regions.

Specifically, as shown in FIG. 5 (graph illustrating dividing lines that divide the point group data into three regions), a window frame 70 with a lateral width set in the range from 10 ms to 100 ms is superimposed on the graph at the start position of the welding section. A plurality of penetration depths present within the window frame 70 is then sorted by depth.

With the measured value of the greatest penetration depth being 100% and the measured value of the smallest penetration depth being 0%, the penetration depth that is set in the range from 5% to 15% and the penetration depth that is set in the range from 85% to 95% are extracted from the plurality of penetration depths present within the window frame 70.

A difference value between the two extracted penetration depths is then calculated, and dividing points that divide the difference value into three equal parts are calculated (shown by white circles in FIG. 5). The window frame 70 is then moved by an appropriate amount set in the range from 1 ms to 20 ms at a time, and pluralities of dividing points calculated at each position after each movement of the window frame 70 are continuously connected. Dividing lines separating the regions (shown by solid lines (D1, D2, D3, and D4) in FIG. 5) can thus be obtained.

Of the three regions into which the point group data is equally divided by the dividing lines, the region closest to the top surface of the first member 61 of the workpiece 60 is herein referred to as the "first region," followed by the "second region" and the "third region," with the "third region" farthest from the top surface of the first member 61 of the workpiece 60. Of the dividing lines, the topmost line (line indicating the penetration depth that is set in the range from 5% to 15%) is herein referred to as D1, the second line from the top as D2, the third line from the top as D3, and the fourth line from the top (line indicating the penetration depth that is set in the range from 85% to 95%) as D4.

Figure 6:
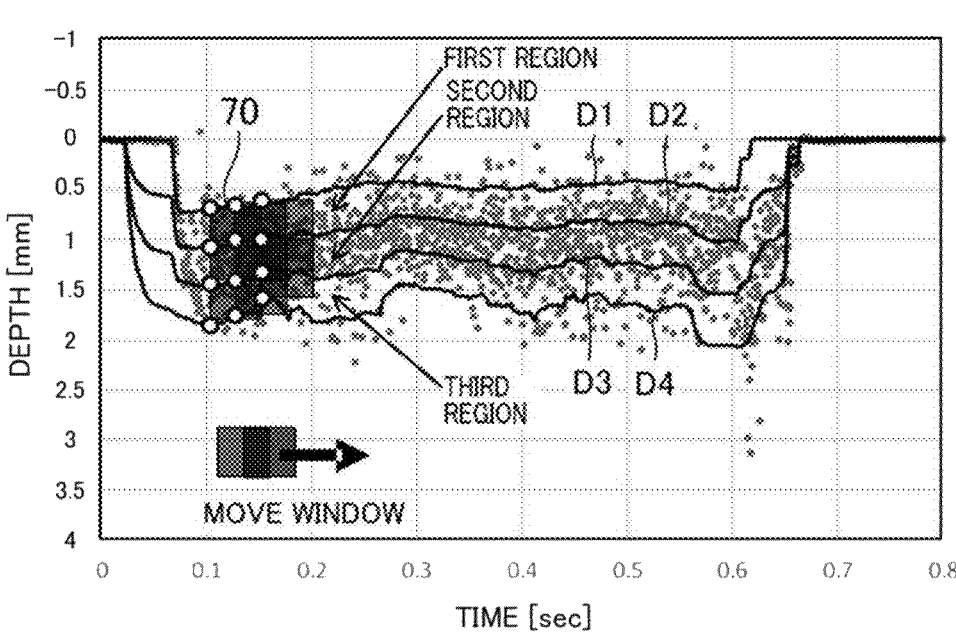
FIG. 6 shows how to count the number of points in each region.

The vertical width of the window frame 70 in the first region is calculated by D2–D1. The vertical width of the window frame 70 in the second region is calculated by D3–D2. The vertical width of the window frame 70 in the third region is calculated by D4–D3. As shown in FIG. 6 (graph showing how to count the number of points in each region), window frames 70 with the same lateral width set in the range from 10 ms to 100 ms are superimposed on the individual regions in the graph. The number of points that indicates the number of measured values present within each window frame 70 is counted for each of the regions.

The window frames 70 are then moved toward the end position of the welding section by an appropriate amount set in the range from 1 ms to 20 ms at a time. The number of points present within each window frame 70 is counted for each region at each position after each movement. Such movement of the window frames 70 and counting of the number of points present within each window frame 70 are repeated from the start position to the end position of the welding section.

Figure 7:
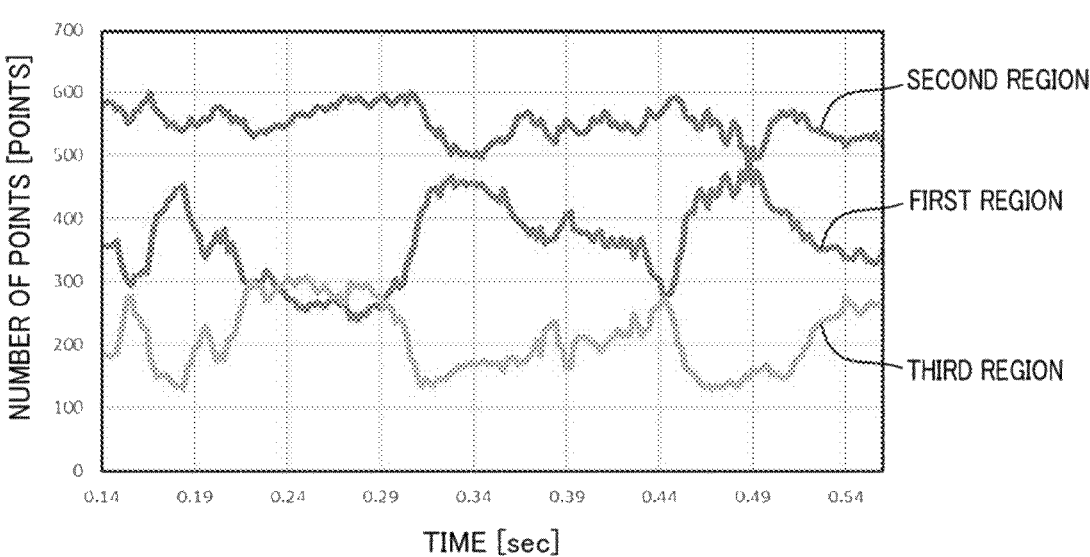
FIG. 7 is a graph showing changes in number of points with time.

As shown in FIG. 7 (graph showing changes in number of points with time), evaluation data showing changes in number of points with time can be obtained for each region by continuously connecting a plurality of numbers of points counted in each window frame 70.

Figure 20:
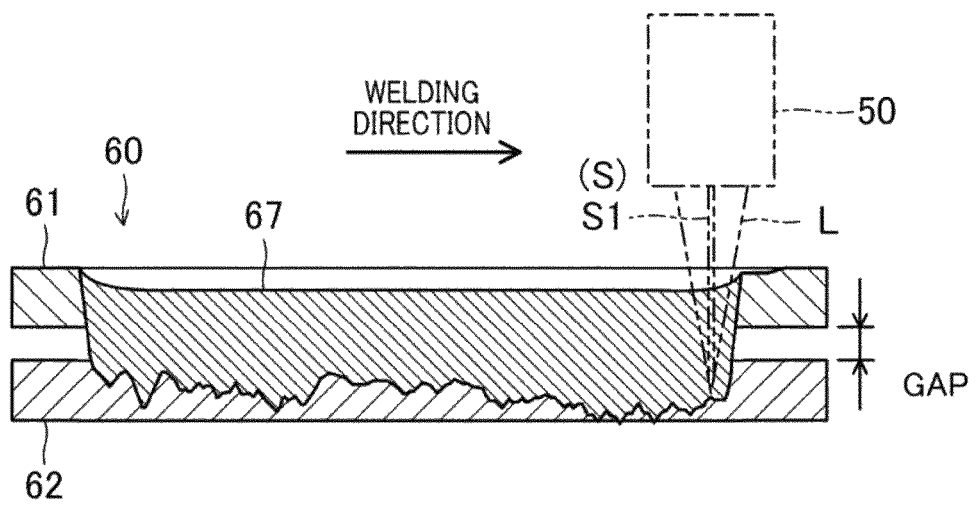
FIG. 20 is a side sectional view when there is a gap between first and second members of a workpiece.

In step ST14 shown in FIG. 2, it is determined whether the number of points acquired in step ST13 is equal to or less than a predetermined value. Specifically, as shown in FIG. 20 (side sectional view when there is a gap between the first and second members of the workpiece), when there is a gap between the first member 61 and the second member 62, the molten metal of the first member 61 flows into the gap during welding, so that the top surface of the welding bead 67 in the first member 61 becomes recessed. The penetration depth of the keyhole 66 measured during the laser welding increases by the amount of the gap. The gap is, for example, 0.5 mm.

Figure 21:
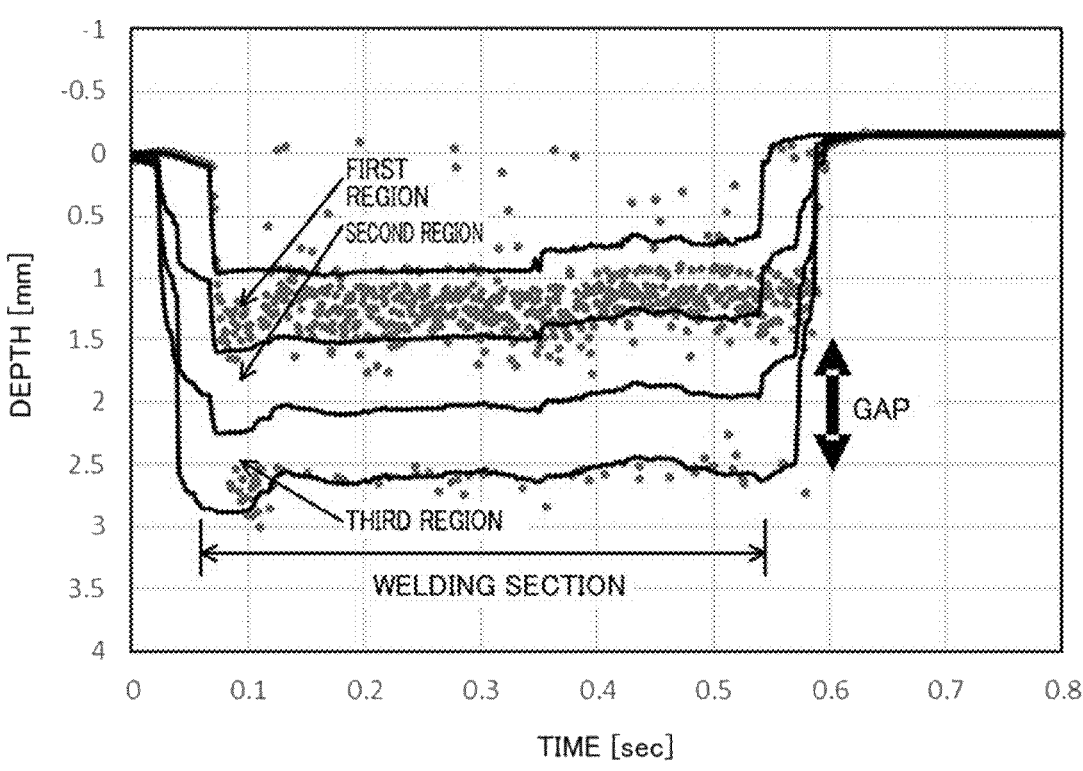
FIG. 21 is a graph showing point group data when there is a gap between the first and second members of the workpiece.

As shown in FIG. 21 (graph showing point group data when there is a gap between the first and second members of the workpiece), the point group data when there is a gap between the first member 61 and the second member 62 shows that the numbers of points in the second and third regions tend to be extremely small.

When "YES" in step ST14, the routine proceeds to step ST15. In step ST15, it is determined that there is a possibility that there is a gap between the first member 61 and the second member 62, and the process ends. When "NO" in step ST14, the routine proceeds to step ST16.

As described above, when the number of points is counted for each of the regions in the point group data and there is a region where the number of points is small, it can be determined that there is a possibility that there is a gap in that region.

In step ST16 shown in FIG. 2, it is determined whether steps ST11 to ST14 have been performed a predetermined number of times. Specifically, in the present embodiment, it is assumed that steps ST11 to ST14 are performed a plurality of times, for example, four times. A plurality of pieces of evaluation data is thus acquired. When "NO" in step ST16, the routine returns to step ST11. When "YES" in ST16, it means that four pieces of evaluation data have been acquired. Therefore, the routine proceeds to step ST17.

In step ST17, an average variation in number of points is calculated for each of the regions based on the plurality of pieces of evaluation data.

In step ST18, it is determined whether the average variation is equal to or larger than a predetermined threshold. When "YES" in step ST18, the routine proceeds to step ST19. In step ST19, it is evaluated that measurement of the penetration depth of the keyhole 66 is unstable under the welding condition.

When "NO" in step ST18, the routine proceeds to step ST20. In step ST20, it is evaluated that measurement of the penetration depth of the keyhole 66 is stable under the welding condition.

Hereinafter, the results of steps ST11 to ST16 in FIG. 2 will be described for the cases where the laser power is 3.1 kW and 2.3 kW. The welding speed is 3.4 m/min.

Figure 8:
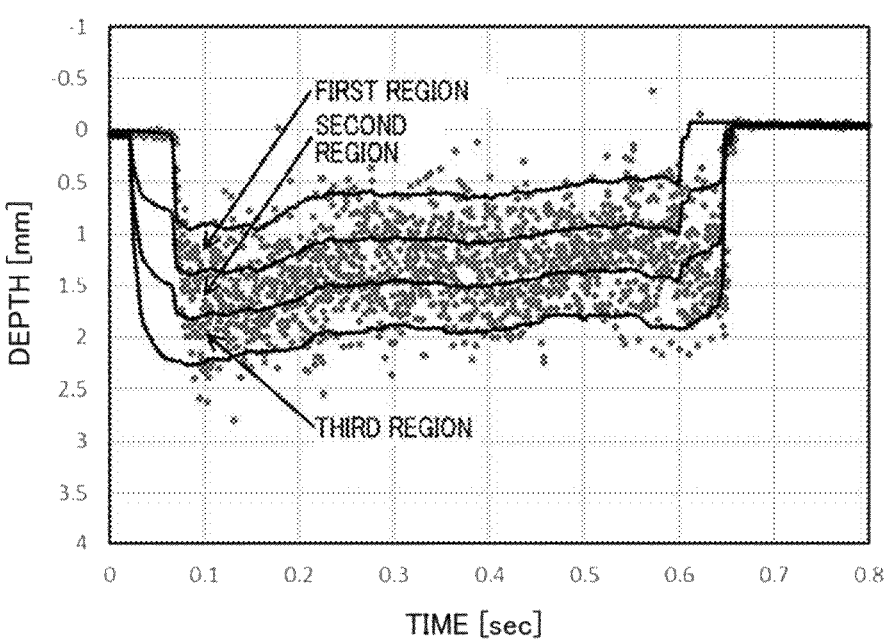
FIG. 8 is a graph showing point group data when the laser power is 3.1 kW.
Figure 9:
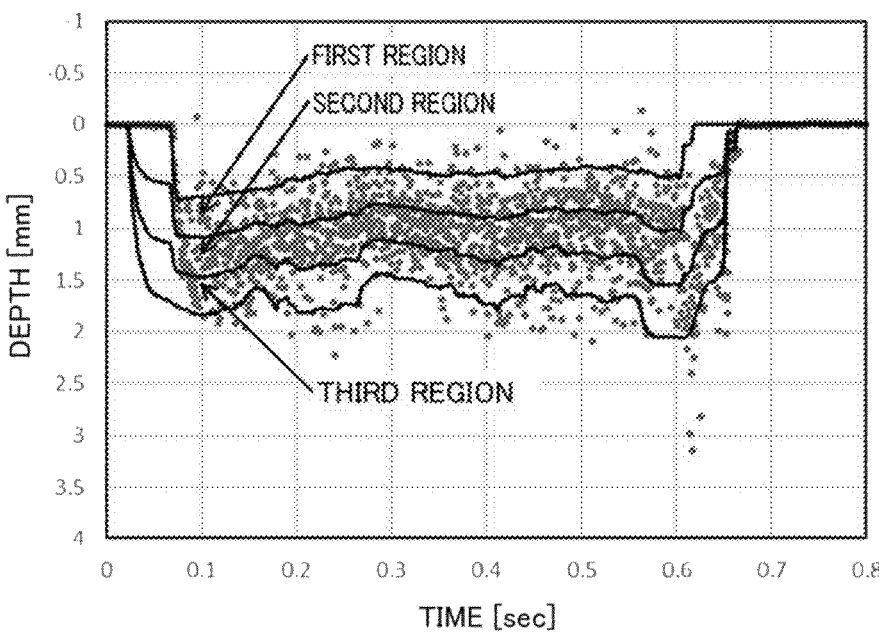
FIG. 9 is a graph showing point group data when the laser power is 2.3 kW.

FIG. 8 is a graph showing point group data when the laser power is 3.1 kW. FIG. 9 is a graph showing point group data when the laser power is 2.3 kW. Comparison of the point group data in each region of FIGS. 8 and 9 shows that the number of points in the third region when the laser power is 2.3 kW (see FIG. 9) tends to be smaller than the number of points in the third region when the laser power is 3.1 kW (see FIG. 8).

By performing steps ST11 to ST16 in FIG. 2 on the point group data in FIGS. 8 and 9, evaluation data as shown in FIGS. 10 to 15 was obtained. Namely, evaluation data that shows changes in number of points in each region with time was obtained for different laser powers, that is, for the laser powers of 3.1 kW and 2.3 kW.

Figure 10:
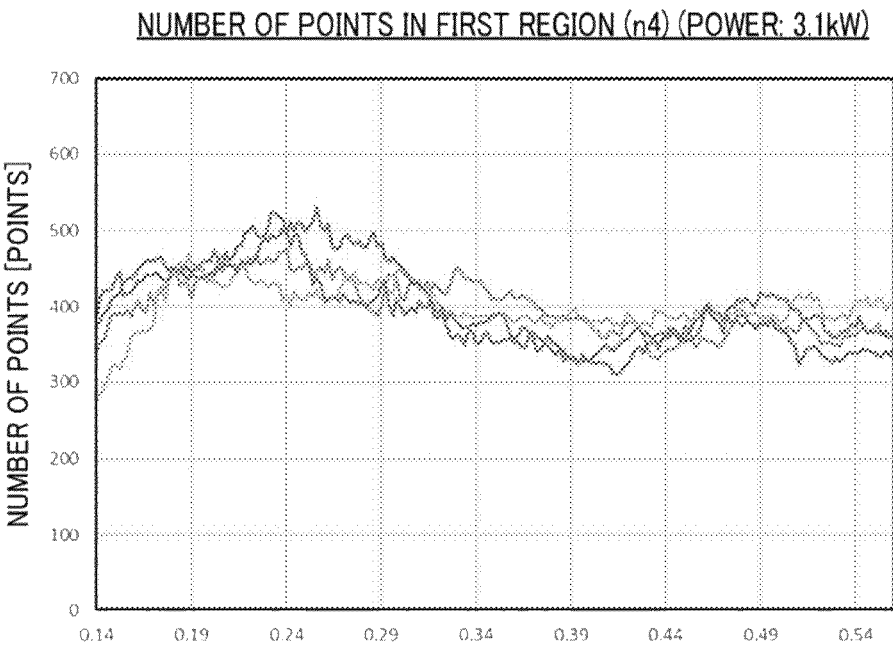
FIG. 10 is a graph showing changes in number of points in the first region with time when the laser power is 3.1 kW.

As shown in FIG. 10 (graph showing changes in number of points in the first region with time when the laser power is 3.1 kW), the four pieces of evaluation data on the number of points in the first region show that, when the laser power is 3.1 kW, the number of points remains stable at substantially the same value in each piece of evaluation data.

Figure 11:
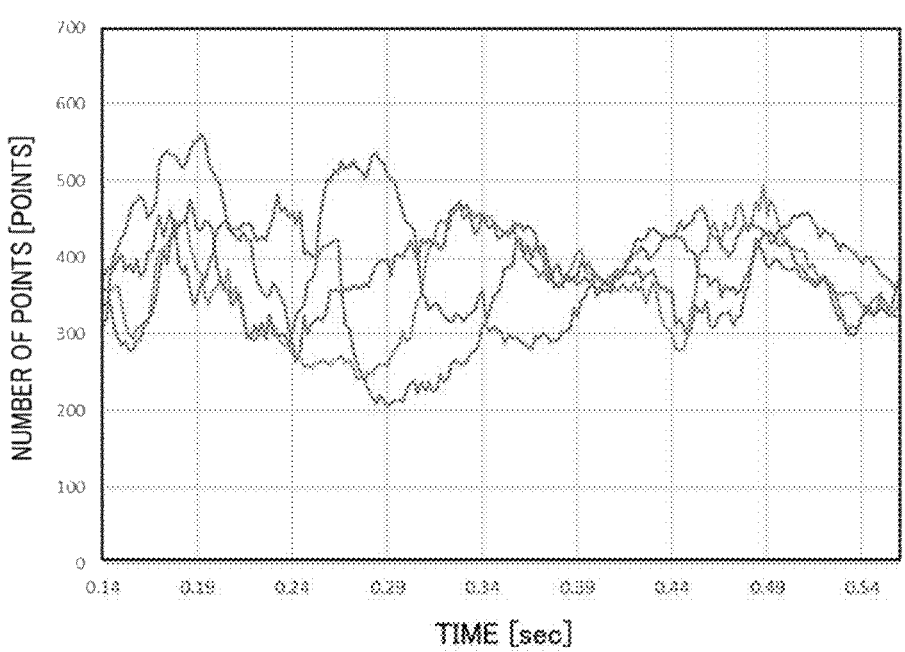
FIG. 11 is a graph showing changes in number of points in the first region with time when the laser power is 2.3 kW.

As shown in FIG. 11 (graph showing changes in number of points in the first region with time when the laser power is 2.3 kW), on the other hand, the four pieces of evaluation data on the number of points in the first region show that, when the laser power is 2.3 kW, the number of points varies greatly in each piece of evaluation data. This is considered to be because the shape of the keyhole 66 is unstable, such as a curved shape with shallow penetration being formed in the front inner wall surface in the welding direction of the keyhole 66.

As shown in FIG. 12 (graph showing changes in number of points in the second region with time when the laser power is 3.1 kW), the four pieces of evaluation data on the number of points in the second region show that, when the laser power is 3.1 kW, the number of points remains stable at substantially the same value in each piece of evaluation data.

As shown in FIG. 13 (graph showing changes in number of points in the second region with time when the laser power is 2.3 kW), the four pieces of evaluation data on the number of points in the second region show that, when the laser power is 2.3 kW, the number of points also remains stable at substantially the same value in each piece of evaluation data.

Figure 14:
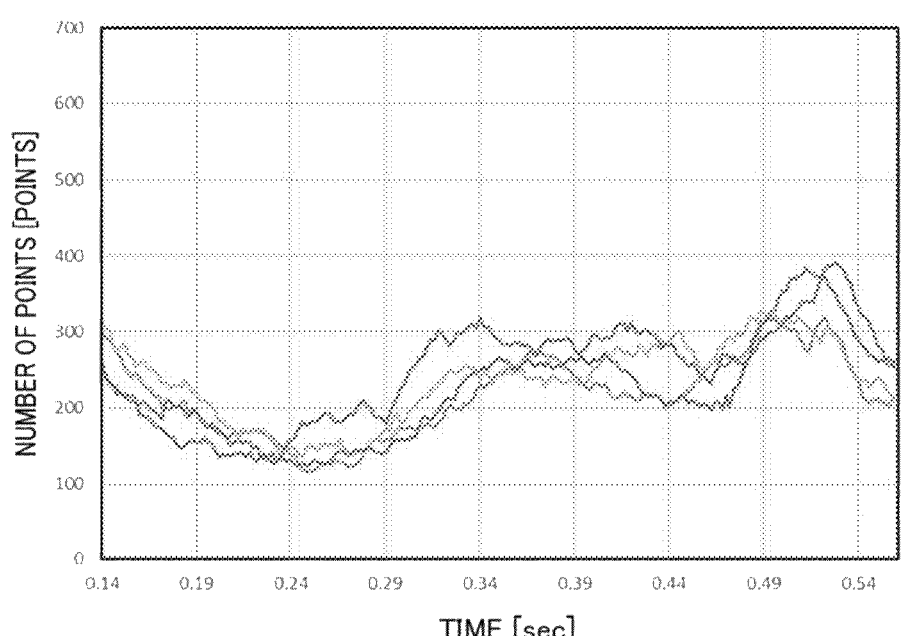
FIG. 14 is a graph showing changes in number of points in the third region with time when the laser power is 3.1 kW.

As shown in FIG. 14 (graph showing changes in number of points in the third region with time when the laser power is 3.1 kW), the four pieces of evaluation data on the number of points in the third region show that, when the laser power is 3.1 kW, the number of points remains stable at substantially the same value in each piece of evaluation data.

Figure 15:
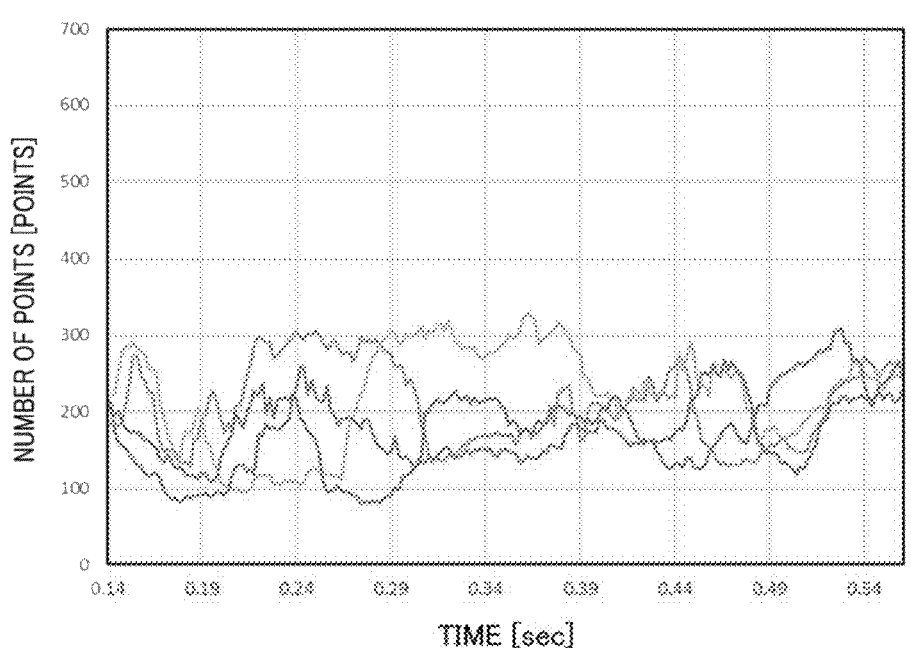
FIG. 15 is a graph showing changes in number of points in the third region when the laser power is 2.3 kW.

As shown in FIG. 15 (graph showing changes in number of points in the third region with time when the laser power is 2.3 kW), on the other hand, the four pieces of evaluation data on the number of points in the third region show that, when the laser power is 2.3 kW, the number of points varies greatly in each piece of evaluation data. This is considered to be because, when the laser power is 2.3 kW, the state of a penetration bead is unstable, such as a penetration bead being randomly formed due to thermal conduction penetration.

Figure 16:
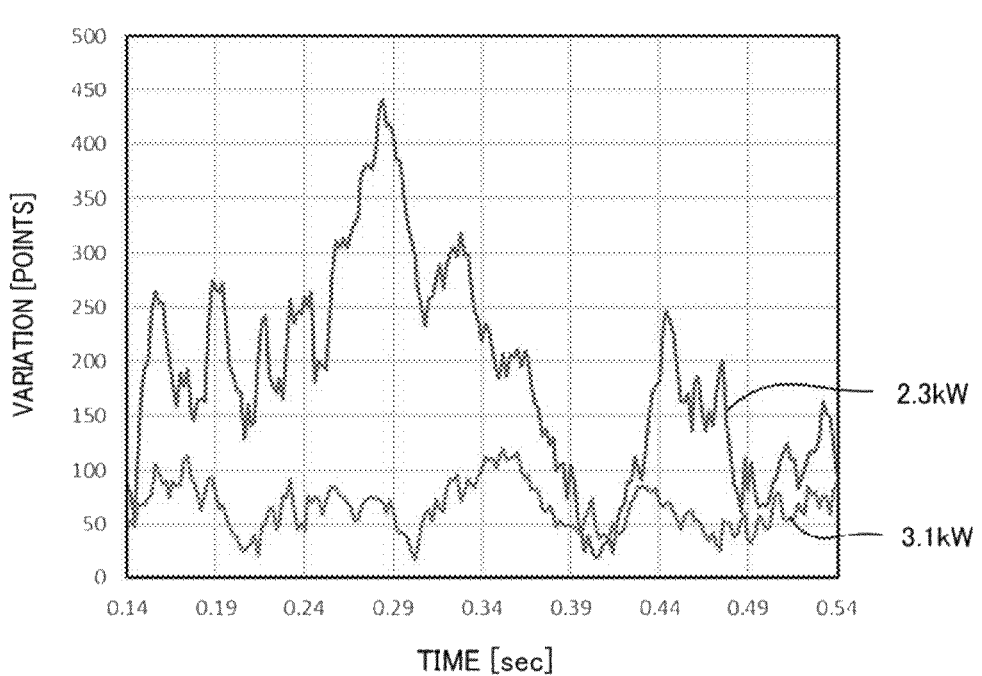
FIG. 16 is a graph showing changes with time in variation among four numbers of points in the first region.

FIG. 16 is a graph showing changes with time in variation among the four numbers of points in the first region for each laser power, namely for the laser powers of 2.3 kW and 3.1 kW. It can be seen from FIG. 16 that the variation among the four numbers of points is larger when the laser power is 2.3 kW than when the laser power is 3.1 kW.

Figure 17:
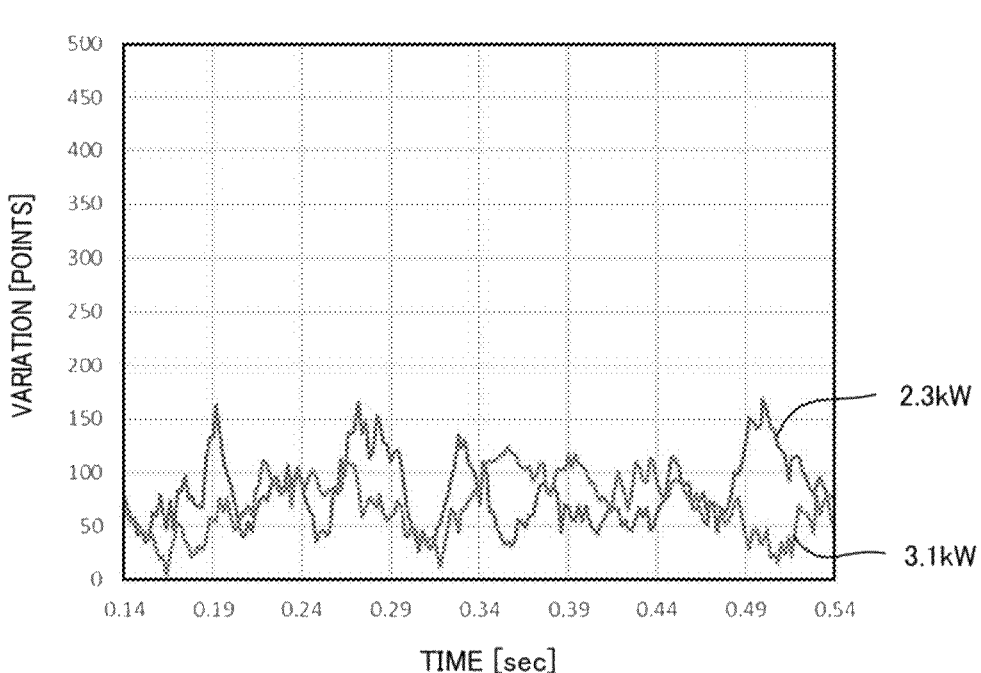
FIG. 17 is a graph showing changes with time in variation among four numbers of points in the second region.

FIG. 17 is a graph showing changes with time in variation among the four numbers of points in the second region for each laser power, namely for the laser powers of 2.3 kW and 3.1 kW. It can be seen from FIG. 17 that the variation among the four numbers of points remains stable and is substantially the same both when the laser power is 3.1 kW and when the laser power is 2.3 kW.

Figures 18, 19:
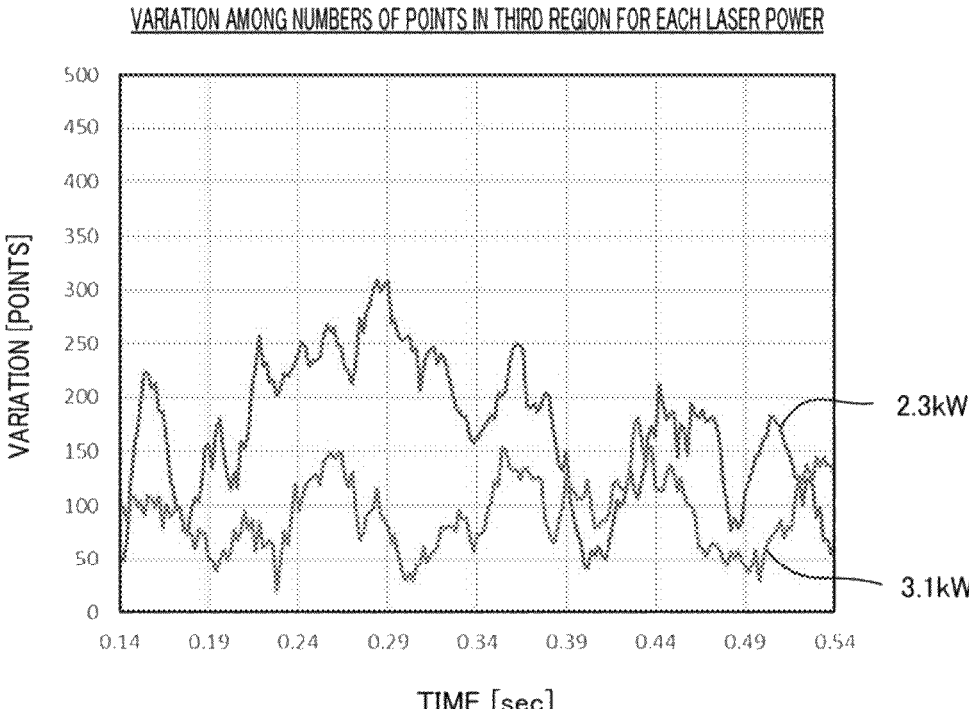
FIG. 18 is a graph showing changes with time in variation among four numbers of points in the third region.
FIG. 19 is a table showing variations among the numbers of points in each region for each laser power.

FIG. 18 is a graph showing changes with time in variation among the four numbers of points in the third region for each laser power, namely for the laser powers of 2.3 kW and 3.1 kW. It can be seen from FIG. 18 that the variation among the four numbers of points is larger when the laser power is 2.3 kW than when the laser power is 3.1 kW.

As shown in FIG. 19 (table showing variations among the four numbers of points in each region for each laser power), when the welding condition is that the laser power is 2.3 kW, the average variations in the first and third regions of the point group data are larger than the average variation in the second region. In the example shown in FIG. 19, when a threshold for the average variations is set to, for example, "130," the average variations in the first and third regions are equal to or larger than the threshold. Therefore, it is evaluated that the welding condition that the laser power is 2.3 kW is not suitable for stably measuring the penetration depth of the keyhole 66.

When the welding condition is that the laser power is 3.1 kW, on the other hand, the average variation of the point group data is small in all of the first, second, and third regions. In the example shown in FIG. 19, the average variations in the first, second, and third regions are equal to or less than the threshold. Therefore, it is evaluated that the welding condition that the laser power is 3.1 kW is suitable for stably measuring the penetration depth of the keyhole 66.

As described above, in the method for evaluating a welding condition according to the present embodiment, whether the welding condition is suitable for stably measuring the penetration depth of the keyhole 66 can be determined by evaluating the average variation in number of points in each region based on the point group data of the measured values obtained during laser welding.

By dividing the point group data into a plurality of regions, namely three regions, and evaluating the number of points in each region, the behavior of the workpiece 60 being penetrated or not penetrated can be grasped from the tendency of the number of points.

OTHER EMBODIMENTS

The above embodiment may be configured as follows.

In the above embodiment, the point group data is divided into a plurality of regions in the depth direction of the measured values. Specifically, the point group data is divided into three regions in the depth direction of the measured values. However, the present invention is not limited to this form. For example, the point group data may be divided into two regions, or may be divided into three or more regions, for example, five regions.

As described above, the present invention is practically advantageous in that it is possible to determine whether the welding condition is suitable for stably measuring the penetration depth of the keyhole. The present invention is therefore extremely useful and highly industrially applicable.

What is claimed is:

1. A method for evaluating a welding condition for performing laser welding by emitting a laser beam to a workpiece, the method comprising:

a first step of emitting a measurement beam to a keyhole of the workpiece during the laser welding to measure a penetration depth of the keyhole;

a second step of dividing point group data showing a plurality of measured values obtained in the first step and times at which the measured values are obtained into a plurality of regions in a depth direction of the measured values;

a third step of counting, for each of the plurality of regions, the number of points that indicates the number of the measured values during a predetermined time, and acquiring, for each of the plurality of regions, evaluation data showing a change in the number of points with time;

a fourth step of performing the first to third steps a plurality of times to acquire a plurality of pieces of the evaluation data;

a fifth step of calculating, for each of the plurality of regions, an average variation in the number of points based on the plurality of pieces of evaluation data; and a sixth step of, when the average variation is equal to or larger than a predetermined threshold, determining that measurement of the penetration depth of the keyhole is unstable under the welding condition.

2. The method according to claim 1, wherein the workpiece includes a first member and a second member placed under the first member, and in the first step, the measurement beam is emitted to the keyhole formed at a position where the first member and the second member are placed on top of one another, the method further comprising:

a seventh step of, when the number of points acquired in the third step is equal to or less than a predetermined value, determining that there is a gap between the first member and the second member.

* * * * *